United States Patent
Rakshit et al.

(10) Patent No.: US 11,832,346 B2
(45) Date of Patent: Nov. 28, 2023

(54) DYNAMIC ESIM CONFIGURATION IN IOT DEVICES BASED ON ACTIVITIES CONTEXT

(71) Applicant: International Business Machines Corporation, Armonk, NY (US)

(72) Inventors: Sarbajit K. Rakshit, Kolkata (IN); Sathya Santhar, Ramapuram (IN)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 17/393,576

(22) Filed: Aug. 4, 2021

(65) Prior Publication Data
US 2023/0038817 A1    Feb. 9, 2023

(51) Int. Cl.
| | |
|---|---|
| G06V 10/82 | (2022.01) |
| H04L 41/147 | (2022.01) |
| G06N 3/0464 | (2023.01) |
| H04W 8/20 | (2009.01) |
| G06N 3/08 | (2023.01) |
| H04L 41/0816 | (2022.01) |
| G16Y 30/00 | (2020.01) |

(52) U.S. Cl.
CPC ........... *H04W 8/20* (2013.01); *G06N 3/08* (2013.01); *G16Y 30/00* (2020.01); *H04L 41/0816* (2013.01)

(58) Field of Classification Search
None
See application file for complete search history.

(56) References Cited

U.S. PATENT DOCUMENTS

| | | | |
|---|---|---|---|
| 10,484,863 B1* | 11/2019 | Ramisetty | H04W 8/22 |
| 10,524,116 B2 | 12/2019 | Xu | |
| 10,880,711 B1 | 12/2020 | Holmes | |
| 11,140,543 B1* | 10/2021 | Indurkar | H04L 67/12 |
| 11,190,985 B1* | 11/2021 | Indurkar | H04L 67/303 |
| 11,477,624 B1* | 10/2022 | Indurkar | H04W 8/183 |
| 11,516,676 B1* | 11/2022 | Holmes | H04W 12/02 |
| 2020/0322884 A1 | 10/2020 | Di Girolamo | |
| 2021/0360719 A1* | 11/2021 | Kwan | H04W 8/183 |
| 2021/0377735 A1* | 12/2021 | Latour | H04W 12/069 |

FOREIGN PATENT DOCUMENTS

| | | | | |
|---|---|---|---|---|
| CN | 109151805 A | * | 1/2019 | ........... H04W 8/183 |
| CN | 111432396 B | * | 2/2023 | ........... H04W 24/02 |
| IN | 201941013795 A | | 10/2020 | |

OTHER PUBLICATIONS

Mayron, Yuval, "Who is set to benefit from eSIM technology?", IoT Now News, Dec. 13, 2018, 8 pages, <https://www.iot-now.com/2018/12/13/91229-set-benefit-esim-technology/>.

* cited by examiner

*Primary Examiner* — Ajit Patel
(74) *Attorney, Agent, or Firm* — Monchai Chuaychoo (57) ABSTRACT

An approach for the capability of managing IoT devices (including eSIMs) and dynamically switch those IoT devices to different network/wireless carriers based on the activity performed is disclosed. The approach can identify poor network connectivity problems with the IoT devices while performing the activities or switching/moving from one activity to another activity and can predict the context of performing the activities with various IoT devices based on identified information. The approach can dynamically adjust the configuration setting of those IoT devices to connect to the appropriate network service provider based on the prediction context of those activities.

20 Claims, 4 Drawing Sheets

DYNAMIC ESIM CONFIGURATION IN IOT DEVICES BASED ON ACTIVITIES CONTEXT

BACKGROUND

The present invention relates generally to wireless communication, and more particularly to eSIM (electronic subscriber identification module) associated with IoT (Internet of Things) devices.

An eSIM is an electronic, or embedded, SIM. Instead of a physical card, SIM technology is built right into smart phones. There is a small chip that is used to authenticate the user's identity with wireless carrier. However, eSIM technology will not just be used in smartphones, but also in a range of consumer devices which require always-on connectivity. This includes wearables, such as smartwatches and smart glasses, connected home devices, and computing devices such as laptops and tablets. Technology which has traditionally connected to Wi-Fi will benefit from the wider availability and security of cellular networks.

In an IoT enabled surrounding, there can be different types of IoT devices, and different types of activities can be performed with combination of various activities. For example, a smart helmet (i.e., IoT cameras and/or microphone embedded) can be used by fire fighter, construction workers, mining workers or working in machine shop floor, and for different activities different additional IoT enabled devices are also required.

SUMMARY

Aspects of the present invention disclose a computer-implemented method, a computer system and computer program product for dynamically adjusting a configuration of devices. The computer implemented method may be implemented by one or more computer processors and may include, training a CNN (convolutional neural network) component with a training dataset; analyzing, by the CNN component, a current activity performed by one or more users, wherein the one or more users is utilizing one or more IoT devices; determining a connectivity status of a network connection associated with the one or more IoT devices; predicting a future activity for the one or more users based in the trained data; and adjusting configuration setting of the one or more IoT devices.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognizes the deficiencies in the current state of art as it relates to eSIM and IoT device management and provides an approach for addressing those deficiencies. The deficiencies can be described by a way of examples.

For example, groups like first responders provide fast assistance in case of accidents, emergency situations, calamities, man-made events, etc. These groups use all IoT enabled devices like connected cars, IoT enabled helmets, jackets etc. There are many telecom solutions specifically designed to support these groups and the IoT enabled devices like Firstnet. As these rescue operations can happen in any area and can be in a remote place (i.e., areas where the network connection is intermittent). These responders also function as a small groups performing coordinated activities. The data center would collect all the IoT related data, correlate within the groups and initiate desired actions. The devices can communicate on their own or they can have a controller installed in their smart watch or jacket which can act as a transmitter to the data center after collecting all the data from the different devices. Same type of IoT devices can be used for different activities (e.g., fire fighter team support to extinguish fire, rescue people from flood/calamities, etc.). Thus, the same IoT devices (that were previously used by firefighters) can be reused (e.g., helmet, shoes etc.) for different activities (i.e., search/rescue operation). However, these IoT devices, particularly the embedded eSIMs, may need to be reconfigured between different activities. Furthermore, the wireless services and the plans are specifically designed for these responders in such a way that it provides high bandwidth and less latency connections. Currently, the IoT devices are configured manually between activities (assuming that someone remembers to do so). Thus, it is possible that these IoT devices being re-used for another activity may not perform as expected (e.g., interrupted network connectivity, etc.).

In some embodiments, an approach to address the above deficiencies can comprise of dynamically reconfiguring (i.e., assigning to appropriate network), through the use of ML (machine learning) and/or AI (artificial intelligence), the eSIMs associated with the IoT devices based on, but is not limited to, context of prior and current activity, capability/capacity of the wireless carrier and number of IoT devices being utilized.

In some embodiments, another approach can predict, through the use of ML (machine learning) or AI, what activity the user is going to perform and accordingly based on context of the activity, dynamically select the appropriately network.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

Figure 1:
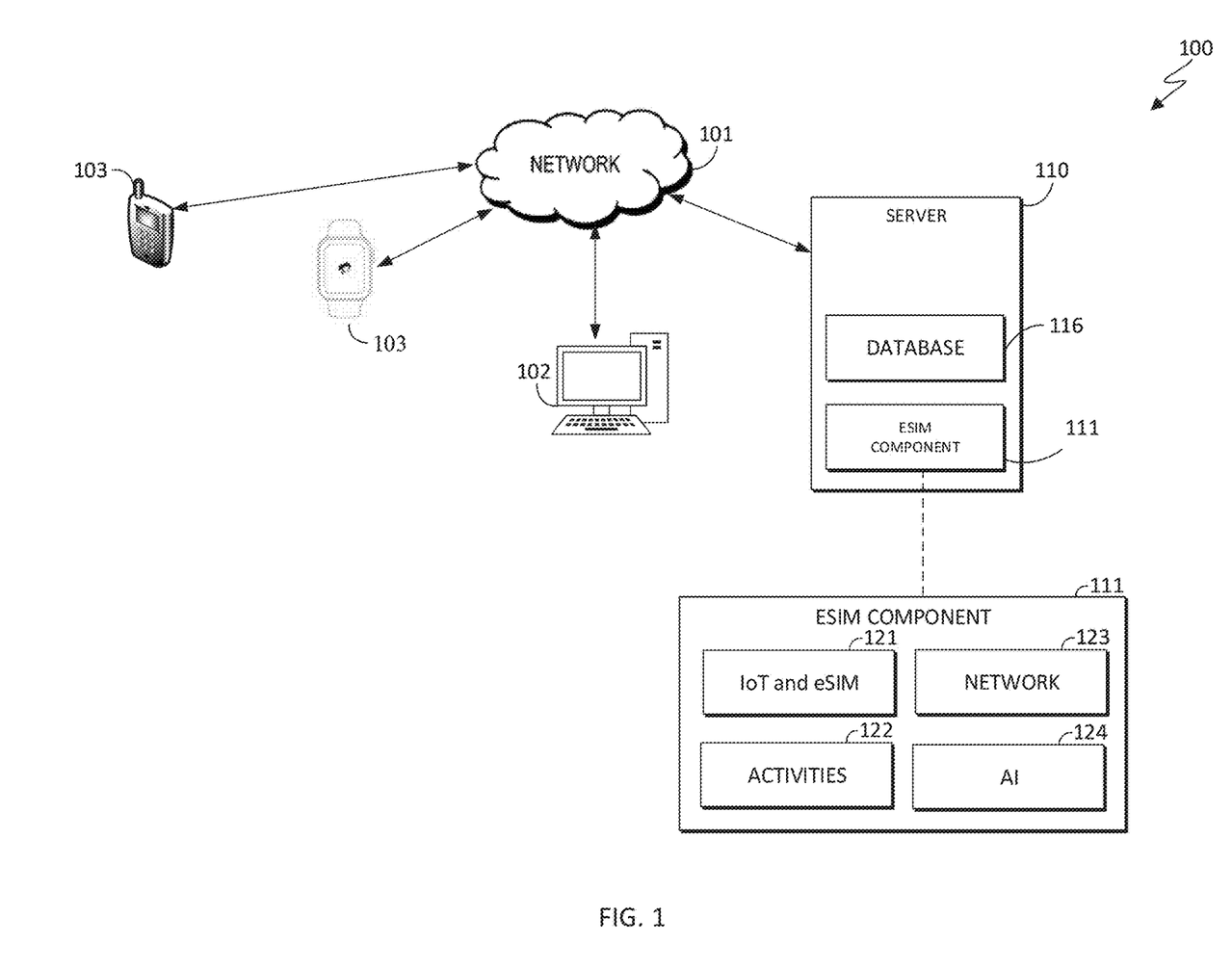
FIG. 1 is a functional block diagram illustrating an eSIM management environment, designated as 100, in accordance with an embodiment of the present invention.

FIG. 1 is a functional block diagram illustrating an eSIM management environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

eSIM management environment 100 includes network 101, client computing device 102, IoT and eSIM devices 103 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110 and other computing devices (not shown) within eSIM management environment 100. It is noted that other computing devices can include, but is not limited to, any electromechanical devices capable of carrying out a series of computing instructions.

Client computing devices 102 are computing devices that can be utilized to, but is not limited to, manual configuration of eSIMs, add or delete IoT devices from a group/activities and create/edit/delete group activities (which can be relay to server 110).

IoT and eSIM devices 103 are electronic devices capable of transmitting data from the device over a network to another computing device. For example, a firefighting helmet is equipped with cameras, sensors and microphone. That same helmet has embedded eSIM so the user of the helmet can communicate to a command center or someone in charge of the operation. The eSIM allows consumers to store multiple operator profiles on a device simultaneously, so in any multi-tasking environment, the IoT enabled devices can identify if the user is performing multiple activities, so based on context of different activities, eSIM of the respective devices will dynamically reconfigured with multi-tasking.

In some embodiments, IoT and eSIM devices 103 can be a flying drone and helper robot (can navigate land-based terrain with "legs").

Server 110 and client computing devices 102 can be a standalone computing device, a management server, a web server, a mobile computing device, or any other electronic device or computing system capable of receiving, sending, and processing data. In other embodiments, server 110 and client computing devices 102 can represent a server computing system utilizing multiple computers as a server system, such as in a cloud computing environment. In another embodiment, server 110 and client computing devices 102 can be a laptop computer, a tablet computer, a netbook computer, a personal computer (PC), a desktop computer, a personal digital assistant (PDA), a smart phone, or any other programmable electronic device capable of communicating other computing devices (not shown) within eSIM management environment 100 via network 101. In another embodiment, server 110 and client computing devices 102 represents a computing system utilizing clustered computers and components (e.g., database server computers, application server computers, etc.) that act as a single pool of seamless resources when accessed within eSIM management environment 100.

Embodiment of the present invention can reside on server 110 or on client computing devices 102. Server 110 includes eSIM component 111 and database 116.

eSIM component 111 provides the capability of managing IoT devices (including eSIMs) and dynamically switch to network/wireless carriers based on the activity performed. For example, eSIM component 111 can identify poor network connectivity problems with the IoT devices while performing the activities or switching/moving from one activity to another activity and can predict the context of performing the activities with various IoT devices based on identified information.

Database 116 is a repository for data used by eSIM component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within eSIM management environment 100, provided that eSIM component 111 has access to database 116. Database 116 may store information associated with, but is not limited to, specifications of IoT devices including eSIM information, activities that IoT devices were used, type of activities performed by users including location, list of wireless/network service provider for eSIMs and SLAs relating the wireless/network service provider.

Figure 2:
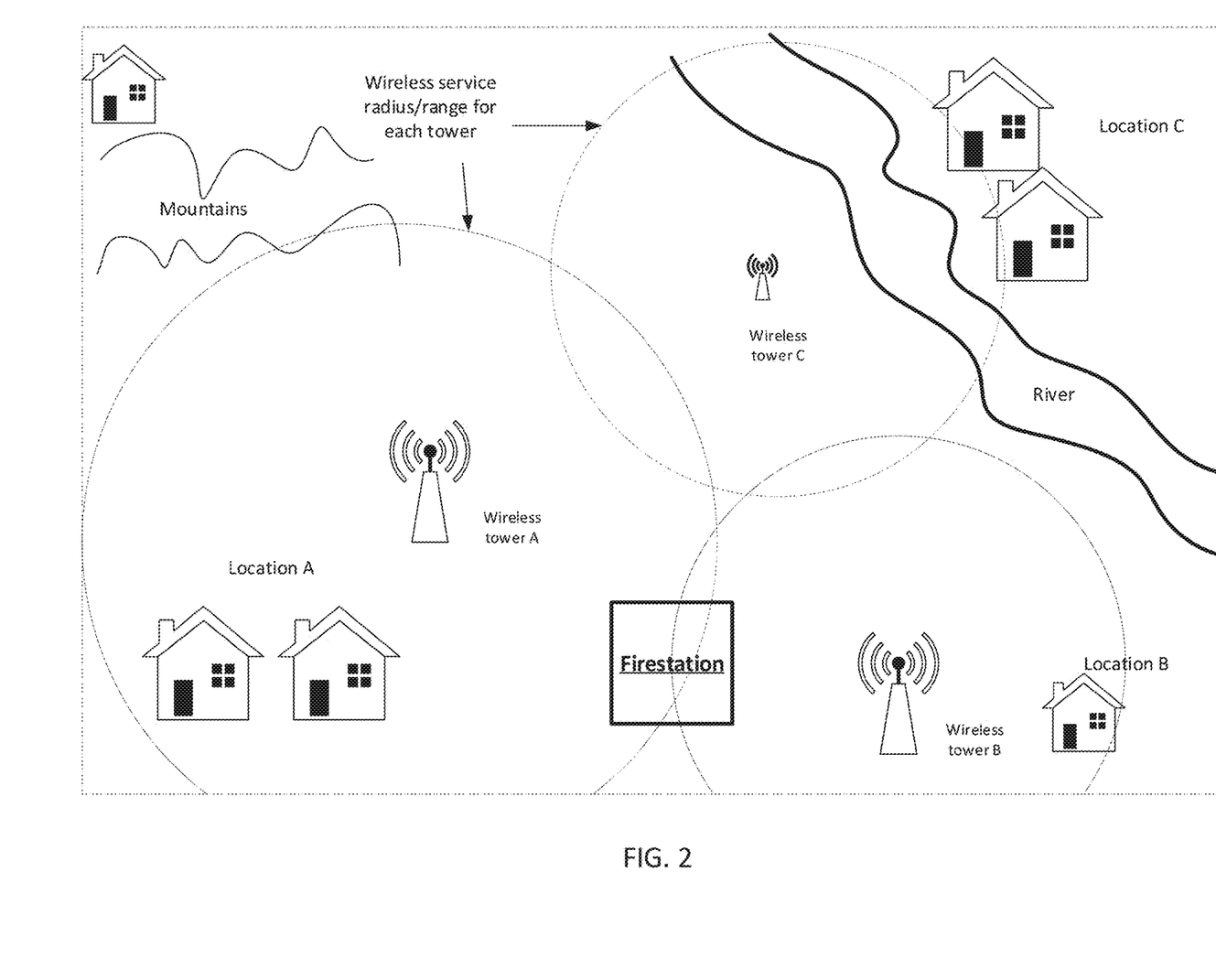
FIG. 2 a map of a fire station service area, wireless tower location (including radius/range marking), terrain description and neighborhood locations, in accordance with an embodiment of the present invention.

FIG. 2 a block diagram illustrating the subcomponents of eSIM component 111, in accordance with an embodiment of the present invention. eSIM component 111 contains subcomponents: IoT and eSIM component 121, activities component 122, network component 123 and AI component 124.

As is further described herein below, IoT and eSIM component 121 of the present invention provides the capability of managing available IoT enabled devices used by a group/organization (e.g., first responders, firefighters, law enforcement personnel, etc.). For example, if there are new equipment that were recently purchased then IoT and eSIM component 121 can add the specifications/capability including a MAC (media access control) address of the devices into inventory or database (i.e., database 116). Alternatively, if an equipment was no longer in used then the MAC address or other electronic identified would be removed from the database.

Additionally, IoT and eSIM component 121 can manage eSIM associated with IoT enabled devices used by a group/organization. For example, if there are new equipment that were recently purchased then IoT and eSIM component 121 can register the IMEI (international mobile equipment identity) of the eSIM into inventory or database (i.e., database 116).

As is further described herein below, activities component 122 of the present invention provides the capability of managing scenarios and activities that the IoT equipment and/or the users of those equipment has been involved. For example, in a recent fire operation, there were six firefighter involved from one fire station which included 20 IoT equipment. However, previously, the same six fire fighters were involved in a search and rescue scenario/activity that involved 25 IoT equipment. These activities are documented and managed by activities component 122.

As is further described herein below, network component 123 of the present invention provides the capability of managing subscription services with various wireless carriers. For example, certain wireless plan with one carrier may have a feature such as low latency and high speed transfer but short distances while another carrier may have a longer range but not high speed. Thus, it is useful to match the type of activity that requires a certain IoT equipment to the appropriate network/wireless carrier.

As is further described herein below, AI (artificial intelligence) component 124 of the present invention provides the capability of learning and predicting activities being performed that require an appropriate network/wireless connection. For example, while performing any activity with various IoT enabled devices, the proposed system can predict the context of the activity, and accordingly eSIM enabled devices will dynamically be configured with activity specific service providers who can meet the SLAs (service level agreement) predicted. The prediction algorithm can rely on the history, for example, if the system finds that the user has activated the IoT enabled devices and based on the devices selected and the area where the action is getting performed, the system would identify the right network provider to be selected or set of providers to be enabled and disabled/switched back and forth as the activity is progressing.

In some embodiments, the prediction capability of AI component 124 can rely on CNN (convolutional neural network) in some embodiments. For example, CNN based context of the activity prediction can be realized by five general steps. Step (1), for example, cameras (mounted on the helmets or carried by the users) will continuously take video frames which will be fed to a trained convolutional neural network to predict the context of the activity performed. The result can be activities like climbing, rescue, protecting people etc.

It is noted that the trained CNN is based on training dataset. The training dataset is made out of dataset of images captured during previous operations and the identified activity. Each image in the training set would be labelled with the activity. Before training, the CNN model would have randomly initiated weights. Then, series of images would be passed through the CNN model. Each image is sent through a 'forward pass' and the loss would be detected (i.e., variance between the predicted activity and the actual activity—each image would correspond to one activity). To reduce the error, gradients are back propagated and weights which were initialized randomly before training would be updated in each pass. Then again another image would be sent through forward pass and backward pass and this would be repeated for all the images in one epoch (cycle). Then this is repeated again for 'N' number of epochs until the accuracy reaches a saturation level.

Step (2), the user would be moving during rescue operations, based on the context of the activity predicted in step 1, the user's future movement is predicted in spatial domain. The next cell (hexagonal cells in mobile system) that the user would move with highest probability is predicted using any of the well-known classification algorithms like k-nearest neighbor, decision trees or support vector machine. This predicts the probable cells that the user would move into with confidence score.

Step (3) as signal strength is continuous in time domain, Gaussian based prediction can be used to predict the signal strength, quality of signal across all service providers serving the cells predicted in step 2. As the values follow normal distribution, probability of having signal strength above a threshold value is calculated for every service provider based on observed values in the past.

Multi variate time series analysis can also be done, as the current value of the signal strength, $y_{1,t}$ depends not only on its own past observations, $y_{1,t1}, y_{1,t2}, \ldots$, but also on the past values of other variables, $y_{2,t1}, y_{3,t1}, \ldots, y_{2,t2}$ and so on. Other variables can be obstacles, signal interference and so on. If there are two time dependent variables, then $y_1(t)=a_1+w_1 11^* \; y_1(t-1)+w_1 12^* \; y_2(t-1)+e_1(t-1)$ and $y_2(t)=a_2+w_2 21^* y_1(t-1)+w_1 22^* \; y_2(t-1)+e_2(t-1)$, where $a_1$ and $a_2$ are the constant terms, $w_{11}, w_{12}, w_{21}$ and $w_{22}$ are coefficients and $e_1$ and $e_2$ are error terms. This can be used to predict the time dependent variables at any time t and this predicted value can be compared across service providers for the switch.

Step (4), After connecting to one of the service providers, the duration of the connection till it switches to the next service provider is determined based on the exponential distribution to identify the next occurrence of signal drop with the current service provider. If the occurrence of signal drop is considered as a random variable $\lambda$, then $\lambda$=average number of events occurring in 1 unit of time $P(X>x)=e-\lambda x$. This gives the probability of the event occurring in x amount of time. This is calculated for all service providers and the service provider with less probability is chosen.

Step (5), the above methods can be applied for each device with IoT sensors so that each device can have different SIM profile at the same time.

In some embodiments, AI component 124 can identify the group involved in the activity, location of activity, timing of the activity, and associated IoT devices with the user to perform the activity etc. AI component 124 can correlate the data for the group predicting what activity the users are going to perform and the context of the activity and accordingly the IoT devices with eSIM will dynamically be configured. This might result in change in provider or change in configuration within a provider. For example, if there are 6 groups of 3 people each involved in a rescue activity, the system can correlate the information of each and every group to analyze if the mode has to be switched for the group based on the type of activity they are involved. If needed, then a trigger it sent to the group to change the provider or the mode within the provider.

In some embodiments, AI component 124 can track if the user is moving from one activity to another activity, and accordingly based on change in the activity, the proposed system will be reconfiguring the eSIM with appropriate service provides to perform the activities. For example, the IoT devices used for a firefighting operation can also be used for some rescue operation in an accident in the same location. As the activity is different, then number of IoT devices used will also be different and the network availability for voice and data would demand different SLAs.

In some embodiments, AI component 124 can determine that if the network connectivity is poor for any provider, it predicts the probability of top few providers and based on that it decides which device has to select which profile. For example, if service provider A and B can serve a location but connectivity is poor for both of them, then the system would decide to go for A for helmets and gloves whereas service provider B for jackets so that the transmission/reception happens continuously.

In some embodiments, AI component 124 can identify the agents and controller would be decided among the IoT devices of every individual or among the groups. For example, for a particular rescue operation, all the devices can act as an agent and jacket can act as controller for collecting the data from other devices and sending to the data center to preserve bandwidth whereas in some other situation which is very worse, many IoT devices can act as agent among a group and couple of devices of few users in that group can act as controllers. In some other situation, all devices can act as controllers.

FIG. 2 a map of a fire station service area, wireless tower location (including radius/range marking), terrain description and neighborhood locations, in accordance with an embodiment of the present invention. FIG. 2 will be used to illustrate in the steps of FIG. 3.

Figure 3:
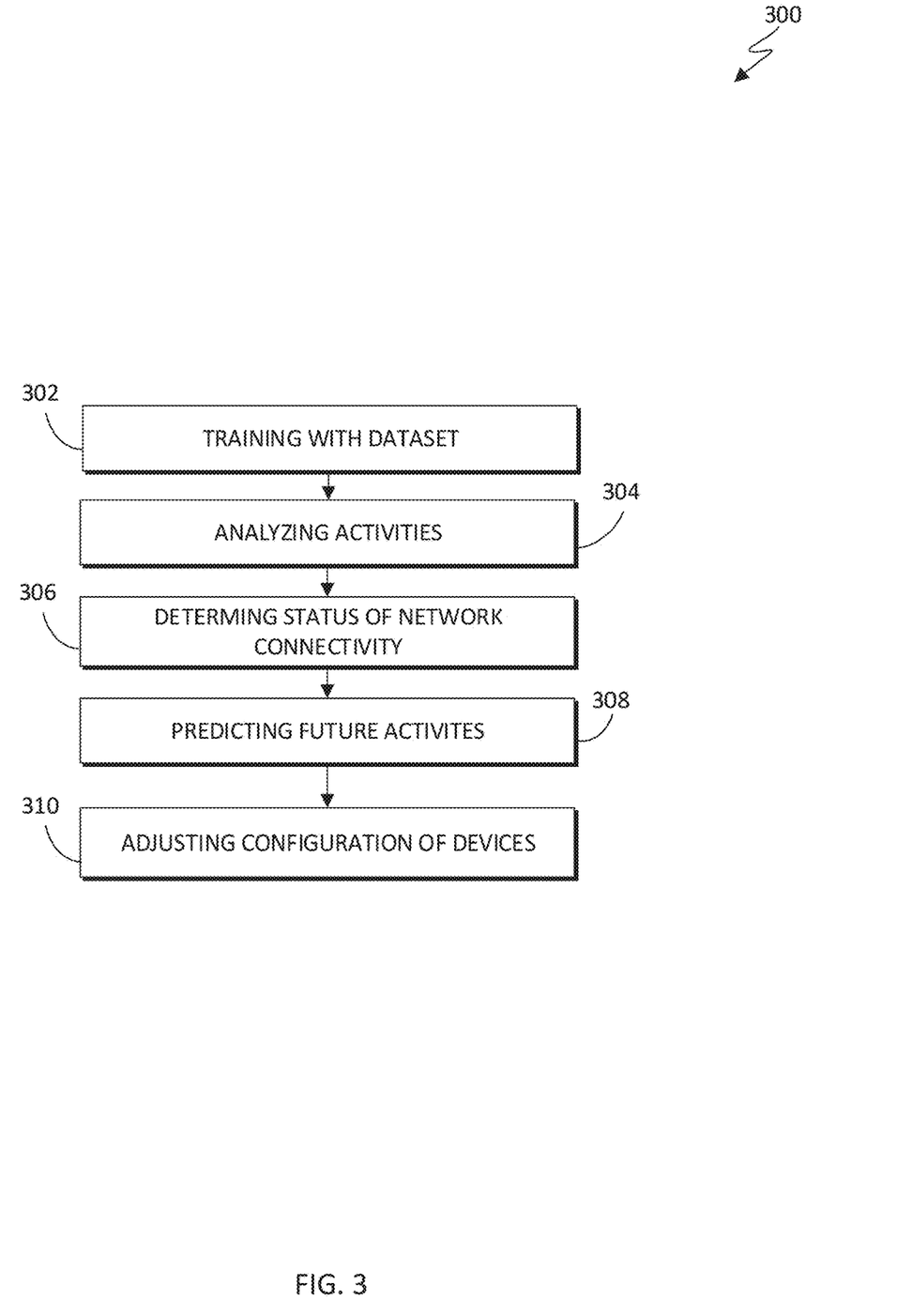
FIG. 3 is a high-level flowchart illustrating the operation of eSIM component 111, designated as 300, in accordance with an embodiment of the present invention.

FIG. 3 is a high-level flowchart illustrating the operation of eSIM component 111, designated as process 300, in accordance with another embodiment of the present invention.

eSIM component 111 train with a training dataset (step 302). In an embodiment, eSIM component 111, trains the AI component 124 with training dataset and/or historical data from activities component 122. For example, the training dataset is made out of dataset of images captured (or GPS location coordinates) during previous operations and the identified activity. Each image in the training set would be labelled with the activity. Before training, the CNN model would have randomly initiated weights. In a use case scenario (see FIG. 2), a group of firefighters (six people) that serves an area of 50 square kilometers that has varying terrain (e.g., forest, residential homes, small rivers running through, several wireless service provider and a population of 5000 in the service area is presented. There are three different wireless carrier (e.g., wireless carrier A, wireless carrier B and wireless carrier C) that is represented in the firefighting service area (see FIG. 2). The firefighter unit has three vehicles and 20 IoT (and eSIM) equipment, ranging from helmets, jackets to a drone. This use case scenario will be used to illustrate process 300. In this scenario, the previous operational activities (including all IoT equipment, which wireless provider was used) have been documented and is part of the training dataset.

eSIM component 111 analyses activities (step 304). In an embodiment, eSIM component 111, through AI component 124 and/or activities component 122, analyzes one or more activities that are currently being performed using various IoT and eSIM devices based on identifying information such as, numbers of users, location, timing, and types of IoT and eSIM devices used in performing the activities. With regards to the use case scenario, the firefighter group was called to put out a fire in a residential neighborhood (Location A) with a good wireless reception/service (from wireless tower A, served by wireless carrier A).

eSIM component 111 determines the status of network connectivity (step 306). In an embodiment, eSIM component 111, through IoT and eSIM component 121 and/or network component 123, determines the metrics of the network being utilized by the IoT and eSIM devices. The metrics can include speed, latency, range, signal strength and reliability of connection. Essentially, eSIM component 111 can identify poor network connectivity problems with various IoT devices while performing the activities or switching/moving from one activity to another activity. With regards to the use case scenario, the firefighter group is still in location A with a good wireless reception (served by wireless carrier A via wireless tower A).

eSIM component 111 predicts future activities (step 308). In an embodiment, eSIM component 111, through AI component 124, can predict the context of performing the activities with various IoT devices based on analyzed and identified information. With regards to the use case scenario, the firefighter group just finished putting out a fire at location A and is alerted that there's a flood in river. eSIM component 111, based on the weather prediction/warning, location of residential housing (location C) is very closed to the river, the embodiment predicts that the houses at location C can get flooded. Additionally, firefighter group gets a call from location C for a rescue operation.

eSIM component 111 adjusts configuration of the devices (step 310). In an embodiment, eSIM component 111, through AI component 124, can dynamically adjusts the configurations of the eSIM or dynamically selecting the best network provider profile stored in the eSIM based on the predicted context of performing activities with various IoT devices. With regards to the use case scenario, firefighting group goes directly from location A to location C. eSIM component 111 dynamically checks the network connectivity status as firefighter group moves from the service radius of wireless tower A towards wireless tower C. eSIM component 111 can adjust the IoT devices (eSIM devices) to automatically switch to use wireless tower C instead of wireless tower A (simultaneously switching from wireless carrier A to wireless carrier B) due to the poor reception from wireless tower A(out of range, see FIG. 2).

In some embodiments, eSIM component 111 can identify each unique device including its capabilities in any IoT enabled ecosystem. While performing any activity, the user can use, multiple IoT devices, and those devices are required for the user to perform the activities. And based on historical data, the proposed system can identify what types of activities are performed, and what IoT devices are used. Furthermore, based on historical data, the proposed system can identify what types of IoT devices are required to perform the activities and based on the historical data, the proposed system can create a knowledge corpus on the types of activities and uses of different IoT devices. Thus, when user wants to perform any activity, then the user will be wearing different types of IoT enabled devices.

In some embodiments, eSIM component 111 can identify which IoT devices the user is wearing, and accordingly from the knowledge corpus the proposed system will be identifying what activity the user will identifying. And based on the predicted activity is to be performed by the user, the proposed system can identifying the context of the activity, the context of the activity can be location, timing and types of activities.

In some embodiments, eSIM component 111 can have a knowledge corpus, and the knowledge corpus will store the service provides with the types of the activities and context of the activities, such as, when the user is wearing various IoT enabled system to perform any activity, then the IoT enabled devices will have at least one eSIM device.

In some embodiments, eSIM component 111 can recognize the eSIM devices with the user and the context of the activity and the IoT enabled devices will also recognize the user who is wearing the IoT devices. Furthermore, eSIM component 111 can identify what combination of IoT devices the user is wearing, the types of activities the user will be performing, and the context of the activities. As different activities and context of activities can have different service providers, eSIM component 111 can identify which mobile service provider network will be selected, including, the identified eSIMs are used for performing the activities, and along which service providers will be selected.

In some embodiments, eSIM component 111 can identify how the eSIMs are to be configured and the information will be sent to respective service provider, the respective service providers will auto-configure the eSIMs for the context of the activity. eSIM component 111 can track if the user is moving out from the activity, or the context of the activity is changed then the system can recognize the new or changed context. Furthermore, eSIM component 111 can send information to remote servers so that the eSIM devices can be auto-configured by the service providers and if any user is multi-tasking, and multiple activities will be performed, then the proposed system will reconfigure the eSIMs.

Figure 4:
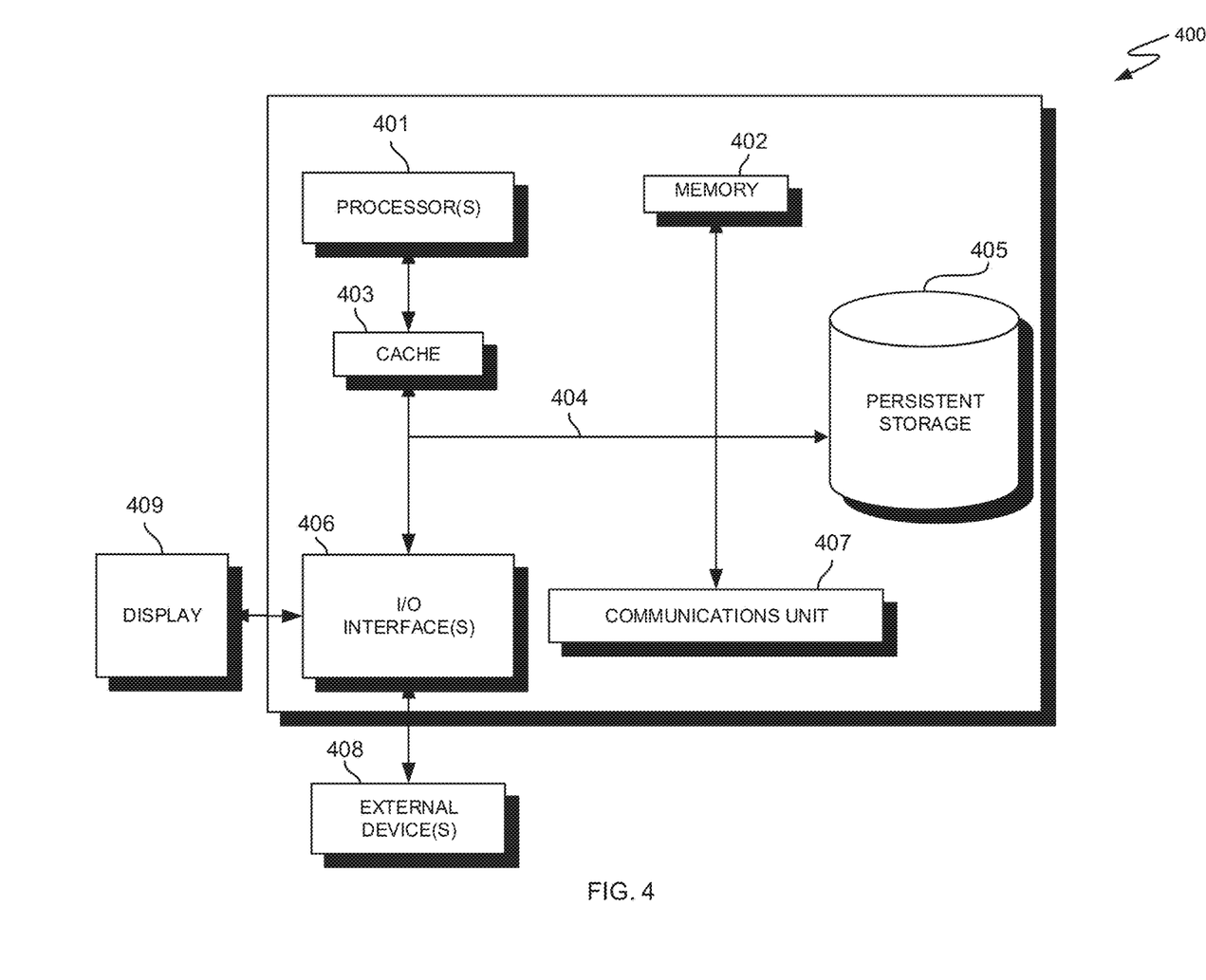
FIG. 4 depicts a block diagram, designated as 400, of components of a server computer capable of executing the eSIM component 111 within the eSIM management environment, of FIG. 1, in accordance with an embodiment of the present invention.

FIG. 4, designated as 400, depicts a block diagram of components of eSIM component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. eSIM component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., eSIM component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., eSIM component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for dynamically adjusting a configuration of IoT devices, the computer-method comprising:
   training a CNN (convolutional neural network) component with a training dataset;
   analyzing, by the CNN component, a current activity performed by one or more users, wherein the one or more users is utilizing one or more IoT devices;
   determining a connectivity status of a network connection associated with the one or more IoT devices;
   predicting a future activity for the one or more users based in the trained dataset, the connectivity status of the network connection and the current activity performed; and
   adjusting configuration setting of the one or more IoT devices.

2. The computer-implemented method of claim 1, wherein training the CNN component, further comprises:
retrieving the training dataset, wherein the training dataset comprises of historical activities and wherein the historical activities comprises location, number of users, IoT devices used, network connectivity status of IoT devices and type of activities;
assigning one or more weights of a training model; and
processing the training dataset through the training model until an accuracy level threshold has been achieved.

3. The computer-implemented method of claim 1, wherein analyzing the current activity, further comprises:
determining a location, number of users, IoT devices used, network connectivity status of the one or more IoT devices, duration of the current activity, type of the current activity and identifying information of the one or more IoT devices, wherein the identifying information further comprises, network service provider, eSIM information, timing, and types of devices used in performing the current activity.

4. The computer-implemented method of claim 1, wherein the one or more users, further comprises, a firefighter, search/rescue crew and law enforcement personnel.

5. The computer-implemented method of claim 1, wherein the connectivity status of the network, further comprises, signal strength, signal connection and signal range.

6. The computer-implemented method of claim 1, wherein predicting the future activity, further comprises:
predicting movement of the one or more users via a spatial domain method based on the current activity and the training dataset; and
predicting the connectivity status via time domain of a Gaussian method based on the predicted movement of the one or more users, wherein the connectivity status includes signal strength.

7. The computer-implemented method of claim 1, wherein adjusting the configuration setting, further comprises:
dynamically adjusting the configuration setting of eSIM belonging to the one or more IoT devices by selecting a network provider profile stored in the eSIM based on the future activity.

8. A computer program product for dynamically adjusting a configuration of IoT devices, the computer program product comprising:
one or more computer readable storage media and program instructions stored on the one or more computer readable storage media, the program instructions comprising:
program instructions to train a CNN (convolutional neural network) component with a training dataset;
program instructions to analyze, by the CNN component, a current activity performed by one or more users, wherein the one or more users is utilizing one or more IoT devices;
program instructions to determine a connectivity status of a network connection associated with the one or more IoT devices;
program instructions to predict a future activity for the one or more users based in the trained dataset, the connectivity status of the network connection and the current activity performed; and
program instructions to adjust configuration setting of the one or more IoT devices.

9. The computer program product of claim 8, wherein program instructions to train the CNN component, further comprises:
program instructions to retrieve the training dataset, wherein the training dataset comprises of historical activities and wherein the historical activities comprises location, number of users, IoT devices used, network connectivity status of IoT devices and type of activities;
program instructions to assign one or more weights of a training model; and
program instructions to process the training dataset through the training model until an accuracy level threshold has been achieved.

10. The computer program product of claim 8, wherein program instructions to analyze the current activity, further comprises:
program instructions to determine a location, number of users, IoT devices used, network connectivity status of the one or more IoT devices, duration of the current activity, type of the current activity and identifying information of the one or more IoT devices, wherein the identifying information further comprises, network service provider, eSIM information, timing, and types of devices used in performing the current activity.

11. The computer program product of claim 8, wherein the one or more users, further comprises, a firefighter, search/rescue crew and law enforcement personnel.

12. The computer program product of claim 8, wherein the connectivity status of the network, further comprises, signal strength, signal connection and signal range.

13. The computer program product of claim 8, wherein program instructions to predict the future activity, further comprises:
program instructions to predict movement of the one or more users via a spatial domain method based on the current activity and the training dataset; and
program instructions to predict the connectivity status via time domain of a Gaussian method based on the predicted movement of the one or more users, wherein the connectivity status includes signal strength.

14. The computer program product of claim 8, wherein adjusting the configuration setting, further comprises:
program instructions to dynamically adjust the configuration setting of eSIM belonging to the one or more IoT devices by selecting a network provider profile stored in the eSIM based on the future activity.

15. A computer system for dynamically adjusting a configuration of IoT devices, the computer system comprising:
one or more computer processors;
one or more computer readable storage media; and
program instructions stored on the one or more computer readable storage media for execution by at least one of the one or more computer processors, the program instructions comprising:
program instructions to train a CNN (convolutional neural network) component with a training dataset;
program instructions to analyze, by the CNN component, a current activity performed by one or more users, wherein the one or more users is utilizing one or more IoT devices;
program instructions to determine a connectivity status of a network connection associated with the one or more IoT devices;
program instructions to predict a future activity for the one or more users based in the trained dataset, the connectivity status of the network connection and the current activity performed; and program instructions to adjust configuration setting of the one or more IoT devices.

16. The computer system of claim 15, wherein program instructions to train the CNN component, further comprises:

program instructions to retrieve the training dataset, wherein the training dataset comprises of historical activities and wherein the historical activities comprises location, number of users, IoT devices used, network connectivity status of IoT devices and type of activities;

program instructions to assign one or more weights of a training model; and program instructions to process the training dataset through the training model until an accuracy level threshold has been achieved.

17. The computer system of claim 15, wherein program instructions to analyze the current activity, further comprises:

program instructions to determine a location, number of users, IoT devices used, network connectivity status of the one or more IoT devices, duration of the current activity, type of the current activity and identifying information of the one or more IoT devices, wherein the identifying information further comprises, network service provider, eSIM information, timing, and types of devices used in performing the current activity.

18. The computer system of claim 15, wherein the one or more users, further comprises, a firefighter, search/rescue crew and law enforcement personnel.

19. The computer system of claim 15, wherein the connectivity status of the network, further comprises, signal strength, signal connection and signal range.

20. The computer system of claim 15, wherein program instructions to predict the future activity, further comprises:

program instructions to predict movement of the one or more users via a spatial domain method based on the current activity and the training dataset; and program instructions to predict the connectivity status via time domain of a Gaussian method based on the predicted movement of the one or more users, wherein the connectivity status includes signal strength.

\* \* \* \* \*